July 23, 1940.　　H. J. ELLEN ET AL　　2,208,791
BATTERY TERMINAL CLAMP
Filed Sept. 5, 1939
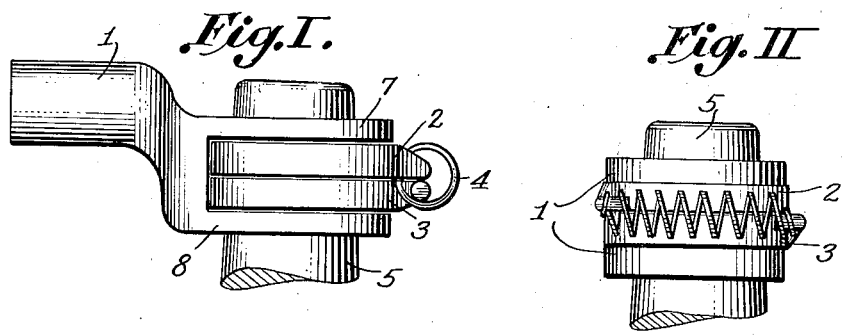
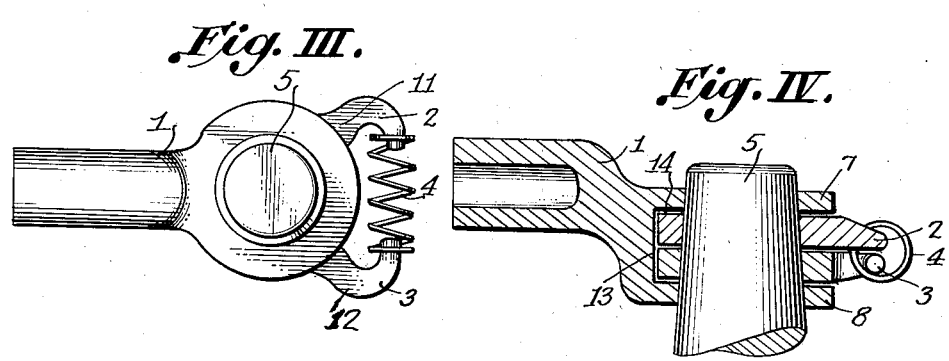
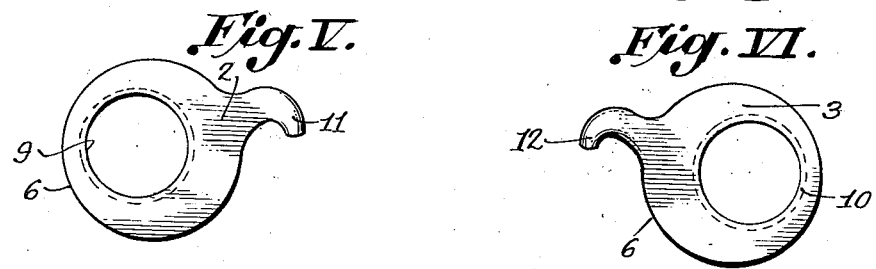
Inventors.

Patented July 23, 1940

2,208,791

UNITED STATES PATENT OFFICE 2,208,791

BATTERY TERMINAL CLAMP

Harry J. Ellen, Gila Bend, and William W. Martin, Phoenix, Ariz.

Application September 5, 1939, Serial No. 293,442

2 Claims. (Cl. 173—259)

Our invention pertains to battery terminal clamps commonly used on automobile and other storage batteries for connecting conduction cables to the storage battery post, and has for its objects first, to provide a terminal clamp which may be attached to the battery cable and may be easily attached and detached from the battery post; second, to provide a device as described which may be easily disassembled to provide easy cleaning and removal of corrosion. A third object is to provide such a device which may be attached and removed from the battery without the use of special tools. A fourth object is to provide such a device wherein there is a constant clamping tension. A fifth object is to provide a device as above described which may be cheaply constructed.

We attain the foregoing objects by means of the construction and devices illustrated in the following drawing, in which Fig. I is a side elevation of the entire device in place on a battery terminal post. Fig. II is an end elevation thereof. Fig. III is a plan view thereof. Fig. IV is a vertical sectional view of the device substantially as illustrated in Fig. I. Fig. V is a plan view of the upper locking eccentric. Fig. VI is a plan view of the lower locking eccentric. Fig. VII is an elevation of the locking spring. Fig. VIII is an elevation of the upper locking eccentric, and Fig. IX is a side elevation of the lower locking eccentric.

Similar numerals refer to similar parts of the several views.

In the drawing numeral 1 refers to the body of the plant which is in the form of a clevis, having two horizontally positioned plates pierced vertically with a hole adapted to receive the battery terminal post 5. A horizontal slot between these plates is sufficiently deep to receive two locking eccentrics 2 and 3. As illustrated the former is positioned on top and the latter beneath. The outer periphery 6 of each of these eccentrics is conformed to that of the plates 7 and 8 of the clevis body. Each eccentric has a hole drilled through it to receive the battery terminal post 5, positioned eccentrically to said outer periphery. These holes are indicated as 9 and 10 respectively. Lugs 11 and 12 extend outwardly from the periphery of each of these eccentrics respectively and form bosses to receive the ends of spring 4. This is a compression spring and as shown in Fig. III the spring is compressed and exerts an outward pressure.

When the clamp is assembled as shown in Figs. I, II and particularly IV, the locking eccentrics fill the space between the plates 7 and 8 of the clevis body and their peripheries contact but do not engage the bottom 13 of the slot 14 between plates 7 and 8 when the lugs 11 and 12 are forced together. However, when these lugs are forced apart, as by pressure of spring 4, then the outer peripheries being eccentric to the holes 9 and 10 engage the bottom 13 of slot 14, causing edges of the vertical holes in the clevis plates 7 and 8 to bite against the terminal post 5 and the opposite inner edges of holes 9 and 10 to likewise bear against the battery terminal. Constant effort from spring 4 makes this biting engagement of the several plates of the clamp continuous, therefore, any vibrations will only assist the clamp in holding tighter. When it is desired to release the clamp pressure will only be applied on the outer portions of bosses 11 and 12 as shown in Fig. III to compress the spring 4 and bring these bosses together. This releases the pressure against the bottom of the clevis slot and permits the clevis to be easily removed.

From the foregoing it will be easily understood that all parts of the device may be quite easily removed for disassembling, cleaning and removing of corrosion. It will also be obvious to those familiar with the art that the position of the locking eccentrics may be reversed. That is they may each be turned over from the position where illustrated so that the bosses point outward instead of inward. Locking may then be effected by compressing the bosses together and a closed spring asserting, a pulling tension may be used instead of spring 4 as here illustrated. The construction and effect, however, is the same and well within the spirit and extent of the present invention. The inside of the holes 9 and 10 of the eccentrics may be beveled to conform to the bevel, if any, of post 5, or opposite thereto to effect sharp biting surface. Optionally, the inside of these holes may be ridged, knurled or otherwise serrated to effect the same result.

Having now fully described our invention and explained its use, we wish to be limited only by the following claims.

We claim:

1. A battery terminal clamp comprising a clevis body having a pair of parallel plates including a slot therebetween and pierced to receive a storage battery terminal post, in combination with a pair of flat locking eccentrics to receive a battery terminal post, eccentrically positioned relative to their peripheries, and outwardly protruding lugs adapted to receive a spring, and a coil spring supported on said lugs on said locking eccentrics by means of two loops extending one from each end of said coil spring and being a part thereof, into each of which is inserted one of said outwardly protruding lugs, said spring extending horizontally therebetween and having tension adapted to normally exert rotary movement to said eccentrics, whereby they are normally held in clamped position with their peripheries bearing on the bottom of the notch between said clevis body plates, thereby effecting engagement between said clevis and said eccentrics and said storage battery post.

2. A battery terminal clamp including in combination a clevis body having a pair of plates positioned to form a slot therebetween pierced with a hole to receive a battery terminal post, a pair of eccentric locks adapted to be positioned between said plates and pierced with holes to receive a storage battery terminal post, said holes being positioned eccentrically as to the peripheries of said eccentrics so that rotary motion of said eccentrics in opposite directions will produce a clamping action on a battery post inserted therethrough, said eccentrics having lugs to receive and retain a clamping spring, and a clamping helical coil spring on the said lugs on said eccentrics, positioned horizontally therebetween to normally exert yieldable rotary effort on said lugs to move them in opposite directions, whereby their eccentric peripheries engage the base of said clevis slot between said plates to effect a clamping action therewith.

HARRY J. ELLEN.
WILLIAM W. MARTIN.